United States Patent
Nute et al.

[11] Patent Number: 6,108,159
[45] Date of Patent: Aug. 22, 2000

[54] DATA TRACK EDGE FOLLOWER SERVO METHOD AND APPARATUS

[75] Inventors: Robert A. Nute, North Grafton; Pravin M. Trivedi, Westborough, both of Mass.

[73] Assignee: Quantum Corporation, Milpitas, Calif.

[21] Appl. No.: 08/891,950

[22] Filed: Jul. 14, 1997

[51] Int. Cl.[7] .................................................. G11B 5/58
[52] U.S. Cl. ............................ 360/77.12; 360/77.01; 360/75
[58] Field of Search ........................ 360/77.12, 77.08, 360/77.11, 77.13, 77.15, 78.01, 78.02, 77.06, 77.02, 77.01, 75, 73.03, 69, 78.13

[56] References Cited

U.S. PATENT DOCUMENTS

| | | | |
|---|---|---|---|
| 4,056,830 | 11/1977 | Smith | 360/51 |
| 4,679,104 | 7/1987 | Dahlerud | 360/78.13 |
| 4,802,030 | 1/1989 | Henry et al. | 360/60 |
| 5,452,152 | 9/1995 | Rudi | 360/77.12 |

*Primary Examiner*—Muhammad Edun
*Attorney, Agent, or Firm*—Fish & Richardson P.C.

[57] ABSTRACT

A data-track head-positioning servo system is disclosed. Data tracks are used to provide position and reference information to a straddle servo head and a reference servo head. The reference servo head provides a reference signal against which the servo signal from the straddle servo head is compared to correct for alignment errors. A transducer head having an integral data transducer, the reference servo transducer, and straddle servo transducer in a fixed spacial relationship is disclosed. A method for using the transducer head in a multitrack tape system is also disclosed.

28 Claims, 6 Drawing Sheets

DATA TRACK EDGE FOLLOWER SERVO METHOD AND APPARATUS

BACKGROUND OF THE INVENTION

This invention relates to head positioning servo systems for reducing misalignment between a read or write head and a data track and also to servo transducers for use with head positioning systems.

Head positioning servo systems are employed in many contexts requiring accurate positioning of a read or write head over a selected data track. Miss-registration between the head and the data track can cause data errors during readback and catastrophic data loss on adjacent tracks during writing.

In multitrack magnetic tape storage systems, random lateral tape motion ("LTM") is a limiting factor in achieving higher track densities and thus higher user data capacity per tape. LTM is an undesirable motion of the tape in the lateral direction, that is transverse to the tape transport direction. LTM may be caused by many factors including, tape slitting variations, tension variations, imperfections in the guiding mechanism, friction variations mainly at the head, and environmental factors such as heat and humidity. These factors affect LTM in various ways. Some may cause abrupt momentary jumps while others may cause a static shift. Generally, LTM is unpredictable and unrepeatable.

Various techniques for increasing the track density on magnetic tape employ recording servo information on the tape to provide positioning information. Some systems record a continuous track of servo information which is then used as a position reference signal. Other systems intersperse or embed the servo information with user data. Yet another system, described in U.S. Pat. No. 5,452,152, uses two auxiliary servo heads to follow each edge of an adjacent track for head positioning.

SUMMARY OF THE INVENTION

This invention features a head positioning servo system which follows a contour of an edge of a data track. As a result, the need for recorded servo information is eliminated, and increased user data storage capacity, simplification of the servo positioning mechanism, and higher servo system bandwidth and data throughput are achieved over other previous techniques. Media costs are also reduced since there is no requirement to prerecord servo information. More consistent and uniform track widths and track spacing over previous techniques may be attained with the invention. A head geometry suitable for use with the invention is simpler and easier to fabricate than with prior schemes. Increased immunity to tape contact differences, dropouts, and tolerance build-ups is also achieved over prior systems. The invention is particularly, but by no means exclusively, useful in multitrack azimuth-recording tape-storage systems.

In one general aspect of the invention, a head positioning servo system for reducing positional errors between a data transducer and a selected data track on a medium, includes a head assembly, a data transducer for writing to or reading from a selected data track, a servo transducer, and a reference transducer. The data, servo, and reference transducers are mounted in a predetermined spacial relationship in the head assembly such that alignment of the data transducer with the selected data track is substantially coincident with alignment of the servo transducer with an edge of a displaced data track and with alignment of the reference transducer with a central portion of the displaced data track. The system includes a servo control circuit having inputs connected to the servo transducer and to the reference transducer. A positioner is connected to the output of the servo control circuit and moves the head assembly. The servo control circuit compares servo signals representative of signals picked up from the servo transducer with reference signals representative of signals picked up from the reference transducer to form a position output signal. The positioner moves the head assembly in response to the position output signal to reduce positional alignment errors between the data transducer and the selected data track.

Preferred embodiments may include one or more of the following features.

The servo transducer is aligned to have approximately one half of its sensor area on the displaced data track and one half of its sensor area off of the displaced data track and the sensor area of the reference transducer is entirely within the displaced data track.

The servo transducer has a length less than or approximately equal to the width of a track and the reference transducer has a length less than or approximately equal to one half of the track width.

The servo transducer has a length of approximately two thirds of the track width and the reference transducer has a length of approximately one third of the track width.

The head assembly may be a magneto-resistive transducer divided into a data transducer having two current leads and a servo portion having a third current lead and a voltage tap. A center current lead forms a gap and allows for signal isolation between the servo portion and the data transducer. The voltage tap divides the servo portion into the servo transducer and the reference transducer.

The predetermined spacial relationship is designed such that the displaced data track is the second track away from the selected data track. The edge of the displaced data track is defined by overlap of complementary azimuthally recorded tracks. The displaced data track comprises an azimuth approximately matching an azimuth of the selected data track.

In another aspect, the invention includes the servo method of using the above head positioning servo system for reducing positional errors between a data transducer and a selected data track while writing to or reading from the selected data track.

In another general aspect of the invention, a transducer head adapted for use with a head positioning servo system for maintaining alignment between the transducer head and a data track includes a data transducer for writing to or reading from a selected data track, a servo transducer, and a reference transducer. The data, servo, and reference transducers are mounted in a predetermined spacial relationship in the transducer head such that alignment of the data transducer with the selected data track is substantially coincident with alignment of the servo transducer with an edge of a displaced data track and with alignment of the reference transducer with a central portion of the displaced data track.

Preferred embodiments may include one or more of the following features.

The displaced track is the second track away from the selected data track.

The servo transducer straddles the edge with one half of its sensor area on and one half of the sensor area off of the displaced data track. The reference transducer has one half the sensor area of the servo transducer.

The transducer head may be made from a magneto-resistive element having a data transducer formed between two current leads and a servo portion formed between two current leads. A current lead forms a spatial gap and allows for signal isolation between the servo portion and the data transducer. A voltage tap is provided which divides the servo portion into the servo transducer and reference transducer.

The servo transducer has a length of approximately two thirds of the track width and the reference transducer has a length of approximately one third of the track width.

In another general aspect of the invention, a method of recording tracks on a record medium includes the steps of writing a first track with a starting track width and writing a second track partially overlapping the first track. A first track edge is defined and the width of the first track is reduced to a first track width. A third track is written defining an adjacent track edge and reducing an adjacent track to a second track width using the first track edge as servo position information and the first track as servo reference information.

Preferred embodiments may include one or more of the following features.

Making the second track width narrower than the first track width. The second track edge and the first track edge each comprises a contour and the step of writing the third track includes defining the contour of the second track edge to be substantially parallel to the contour of the first track.

The first track edge and the adjacent track edge are defined by overlap of complementary azimuthally recorded tracks.

The step of writing the first track is carried out with a first azimuth and the step of writing the second track is carried out with a second azimuth. The second azimuth is substantially complementary to the first azimuth. The step of writing the third track is carried out with a third azimuth and the third azimuth is substantially complementary to the second azimuth and substantially matches the first azimuth.

In another general aspect of the invention, a tape drive system includes a head assembly, a tape transport for moving magnetic tape past the head assembly, and an interface for communicating with a computer. The tape drive system also incorporates any one of the head servo positioning systems described above.

Other features and advantages of the invention will become apparent from the following description and from the claims.

DESCRIPTION OF THE PREFERRED EMBODIMENTS

Figure 1:
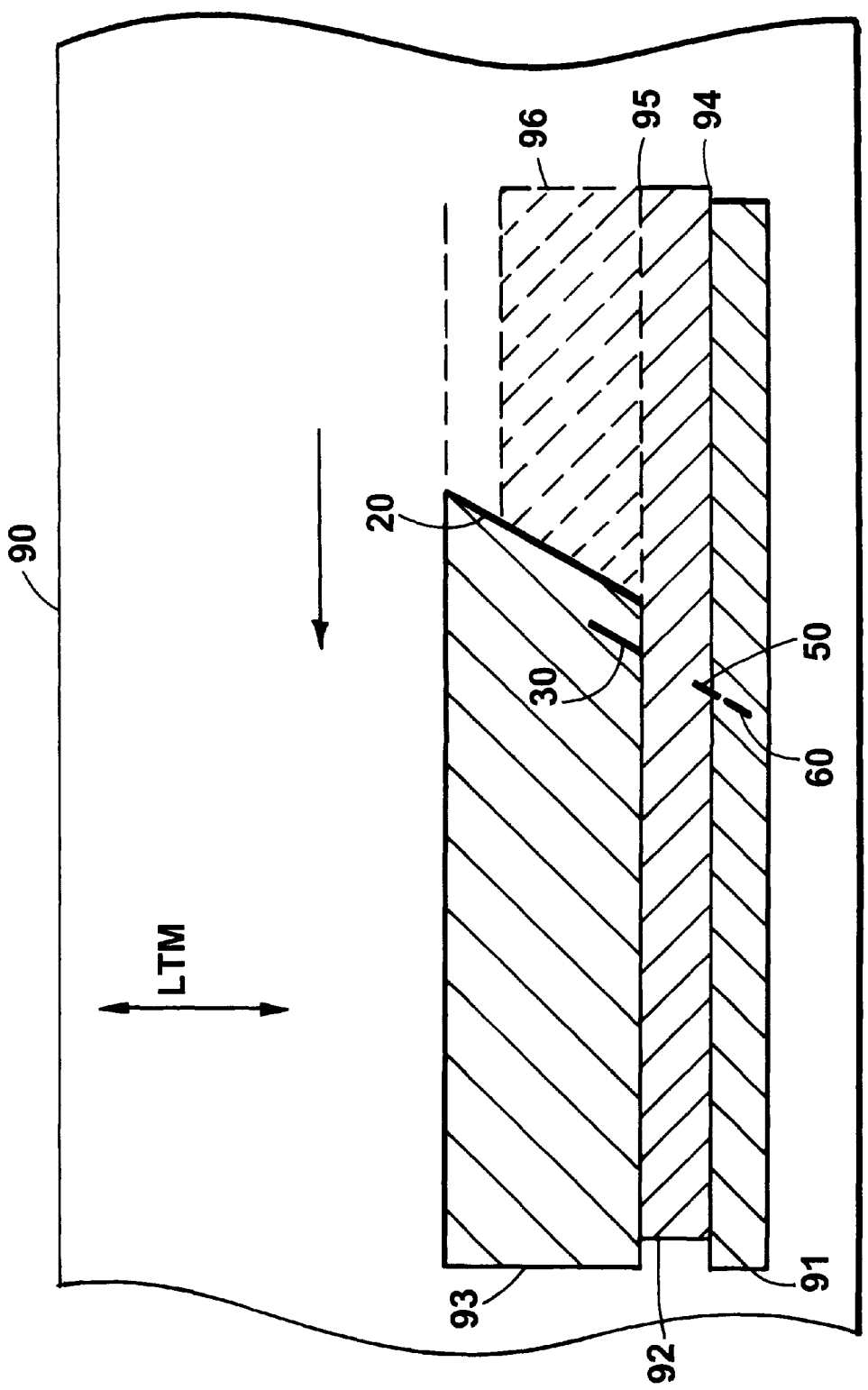
FIG. 1 schematically shows a section of a multitrack tape with azimuth read, write, and servo heads superimposed.

Referring to FIG. 1, a section 90 of tape is shown with data tracks 91 and 92 recorded with complimentary azimuth angles. A third track 93 is shown in the process of being recorded by write head 20. Overlap recording such as illustrated in FIG. 1 employs a write head that is wider than the track pitch. For example, write head 20, shown superimposed on the tape, is wider than tracks 91 and 92 in FIG. 1. Each data track is recorded so that it overlaps the previously recorded adjacent track. The track pitch is thus determined by the amount of overlap. Referring to FIG. 1, write head 20 overlaps a portion 96 of track 92 as track 93 is recorded. Track 92 is thus reduced from the full width shown in dashed lines corresponding to the width of the write head to its final width shown in solid lines.

A read head 30 and servo heads 50 and 60 are also shown schematically superimposed on the tape 90. Read head 30 follows the bottom portion of track 93 which is the portion that will remain after the next track (not shown) is recorded. The read head 30 provides signals to a data channel as is well known in the art. As discussed in greater detail below servo heads 50 and 60 may be axially aligned with and spaced apart from read head 30.

The servo heads are positionally fixed with respect to the read head 30. When read head 30 is aligned with track 93 the straddle servo head 50 will be positioned to straddle the edge 94 of data track 91 as shown in FIG. 1. Because the tracks are complementary azimuthally recorded, data signals from track 91, but not track 92, will be picked up by straddle servo head 50. The signal amplitude produced by straddle servo head 50 will therefore be dependent upon its registration with the edge 94 of track 91.

Figure 2:
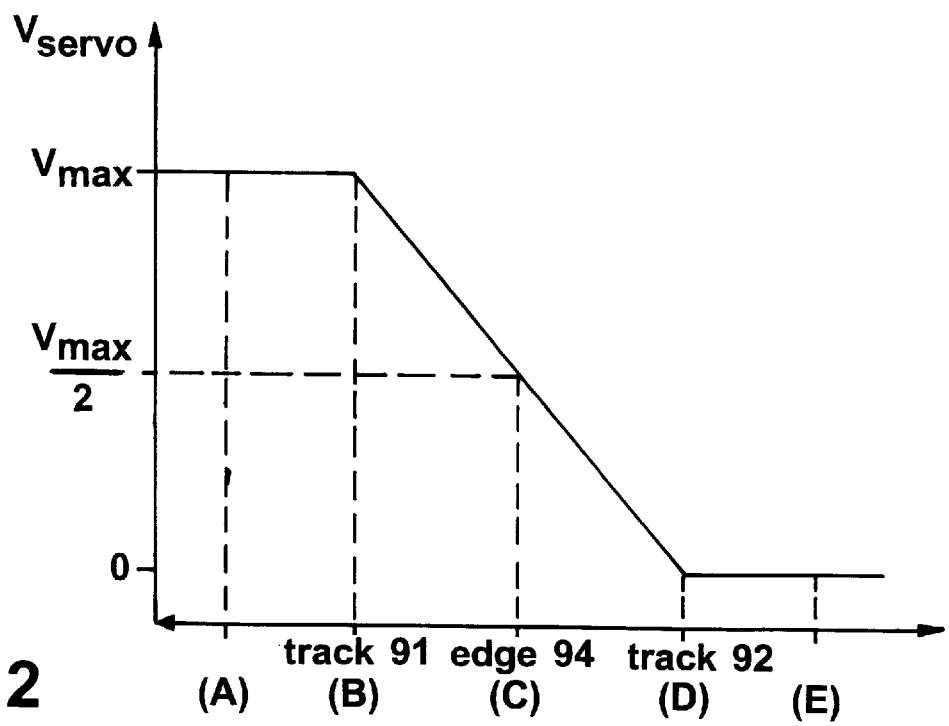
FIG. 2 schematically shows a transfer function of head output voltage versus head position relative to an azimuthally recorded track edge.
Figure 3:
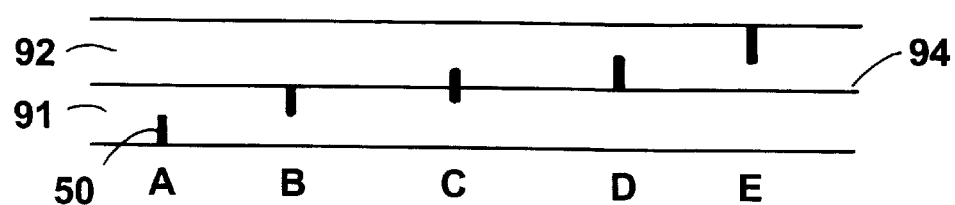
FIG. 3 schematically shows various head positions relative to a track edge.

Referring now to FIGS. 2 and 3 the relationship between the signal amplitude produced by servo head 50 and the relative position of servo head 50 to track edge 94 will be explained. In FIG. 3, servo head 50 is schematically shown in five positions relative to track 91 and edge 94, labeled A through E. Servo head 50 is shown: completely on track 91 and near the lower edge in position A; completely on track 91 and near edge 94 in position B; half on track 91 and half on track 92 (equally straddling track edge 94) in position C; completely off track 91 (on track 92) and near edge 94 in position D; and completely off track 91 (on track 92) and near the upper edge in position E.

Referring to FIG. 2, the approximate transfer function of voltage vs. head position for a read head relative to a data track is illustrated. A read head such as straddle servo head 50 produces a maximum signal amplitude, Vmax, when it is completely on data track 91 which corresponds to any position between A and B. The actual value of Vmax will depend upon the head, media, and recording characteristics. As the head moves off of track 91, past position B toward position C, the signal begins to drop in amplitude. The decrease in amplitude is approximately linearly proportional to the displacement of the head off of track 91. At position C, with the head equally straddling a track edge such as track edge 94, the signal amplitude is approximately equal to one half of Vmax. Further displacement of the head off of track 91 results in further decreases in amplitude until the head reaches position D where it is completely off of track 91 and the amplitude falls to zero.

During normal operation read head 30 will be correctly aligned with a data track such as data track 93 and straddle servo head 50 will be in a neutral position straddling an edge of a displaced data track such as track edge 94 between tracks 91 and 92 (position C). In the neutral position, the amplitude of the straddle servo head 50 output varies linearly with the lateral displacement of the straddle servo head 50 from track edge 94 which is also indicative of the displacement of the read or write heads from the selected data track. Thus, any lateral tape movement will be reflected in changes in the amplitude of the servo signal from servo head 50. The signal will increase if servo head 50 shifts from a centered straddle position onto track 91 and, conversely decrease, if the shift is off of track 91.

The amplitude of the signal produced by a read head such as straddle servo head 50 is also influenced by non-positionally induced factors such as variations in the head to tape interface due to dust, dirt, imperfections in the media and coatings, thermal asperity, etc. Furthermore, variations in the data recorded on the data track may cause variations in the amplitude. For example a data pattern with strong low frequency components may produce a higher amplitude in a peak envelope detector than patterns with more prominent high frequency components. Unless compensation for such variations is provided, the amplitude variations would be interpreted as positional errors by the servo system.

To help solve these problems, a second, reference servo head 60, preferably axially aligned with and spaced close to straddle servo head 50, is used to provide a reference signal for the servo system. Preferably, reference servo head 60 is positioned to remain completely on track 91 (between positions A and B in FIG. 3) during normal operation. That way, reference servo head 60 provides a constant signal amplitude equal to Vmax from track 91. The reference and straddle servo heads 60 and 50 are preferably spaced closely next to each other e.g., 0.5 mils apart, so that any dropouts or variations in signal amplitude from data track 91 will be likely to appear simultaneously in both signals. The heads 50 and 60 are preferably aligned axially so that data patterned induced amplitude variations will also appear simultaneously in the signals. Because the non-positionally induced variations in signal are also reproduced by reference servo head 60, its output is used as a reference signal for evaluation of the servo signal from straddle servo head 50 thereby cancelling out the non-positionally induced variations and eliminating the problems discussed above.

Figure 4:
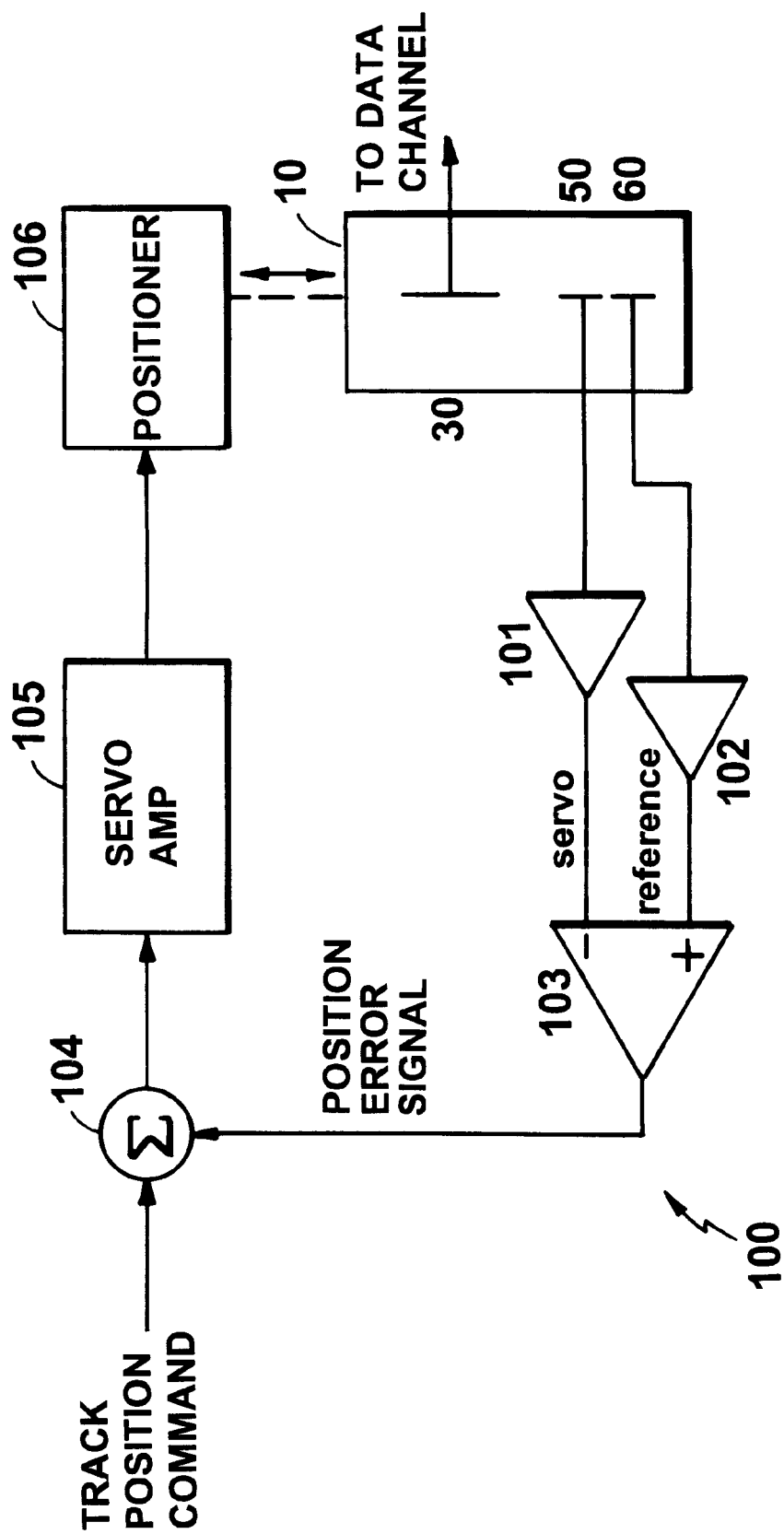
FIG. 4 schematically shows a functional block diagram of the servo system.

Referring now to FIG. 4, the operation of a servo system 100 using servo heads 50 and 60 and employing the principles discussed above in connection with FIGS. 1 through 3 will be described. A head assembly 10 is schematically shown having a data head 30, straddle servo head 50 and reference servo head 60. The data head is connected to a typical data channel (not shown) for reading or writing data.

Straddle servo head 50 and reference servo head 60 are respectively connected to amplifiers 101 and 102. Amplifiers 101 and 102 may be differential amplifiers. Amplifiers 101 and 102 provide amplification and simple low pass filtering and peak envelope detection of the respective servo and reference signals. Additionally, a scaling factor may also be provided. The outputs of amplifier 101 and 102 are designed to be equal when the heads are in the neutral position (servo head 50 is equally straddling track edge 94, i.e. position C, and reference head 60 is fully on track 91, i.e. between positions A and B).

To accomplish equal signal amplitudes in the neutral position, heads of the same size and sensitivity may be used for the straddle and reference servo heads with amplifier scaling. In that case, amplifier 102 may for example be set for a gain of X with amplifier 101 having a gain of 2X. Alternatively, the size and thus the sensitivity of reference head 60 may be reduced to 50 per cent of the size and thus sensitivity of servo head 50, leaving amplifiers 101 and 102 with equal gains. Typically, the outputs of amplifiers 101 and 102 should be equal when the servo heads are in the neutral position. Fine adjustments in track pitch may be made by adding a DC offset to either the reference signal or servo signal causing the straddle servo head to be positioned slightly offset from the neutral position. In this way, the system may adjust for variations in head dimensions which would otherwise change the track pitch.

Difference amplifier 103 subtracts the servo signal on line 500 from the reference signal on line 600 to derive a position error signal on line 700. The position error signal 700 is input to summing junction 104 where it is combined with a track position command signal which determines which track is selected. The magnitude and direction of any misregistration between the head and the data track is thus detected by straddle servo head 50 and reflected in the magnitude and sign of the deviation of the servo signal 500 from reference signal 600 (Vmax/2 as adjusted by any added DC offset). The deviation is fed back to the servo amplifier through summing junction 104. Servo amplifier 105 drives head positioner 106 which moves the head assembly 10 including the servo and data heads back into alignment. It will be appreciated that the servo system 100 measures and corrects for misregistration of the heads with the data track using the edge of a displaced data track as a servo reference.

Figure 5:
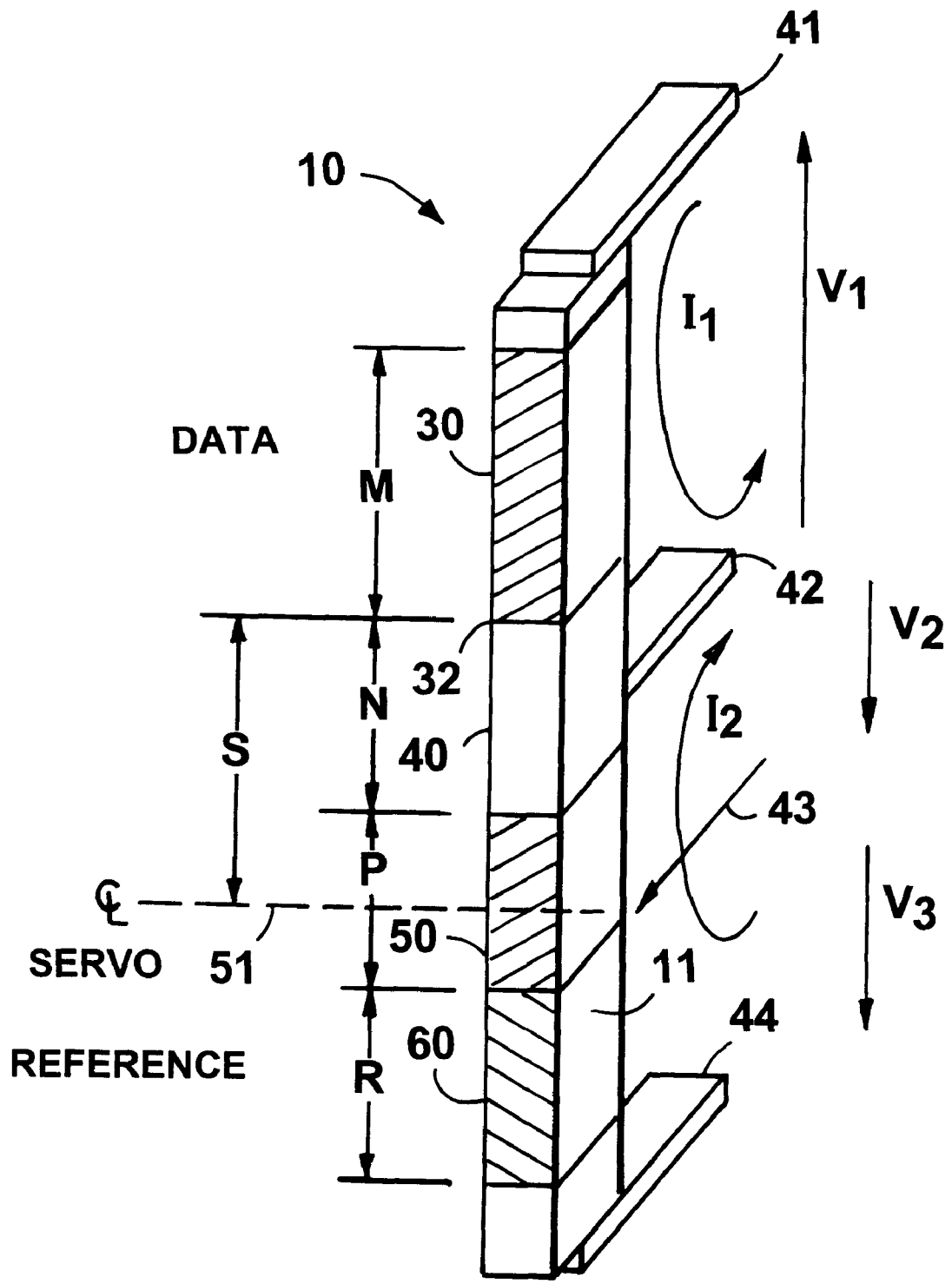
FIG. 5 schematically shows a compound magnetoresistive read and servo head for use with the servo system.

Referring now to FIG. 5, a compound magneto-resistive read head 10 adapted for use with the servo system of FIG. 4 will be described. A single magneto-resistive element 11 is preferably constructed having three current taps 41, 42, and 44 to provide for isolation between the data head 30 and the servo heads 50 and 60. Using three current leads allows for independent biasing of the servo heads and the data head as illustrated by independent bias currents I1 and I2 in FIG. 5. The center current tap 42 is connected at element 40 which may be an insensitive gap portion and may be made of permanent magnet material. A voltage tap 43 is provided to divide the servo portion of the magneto-resistive element 11 into the separate straddle servo head 50 and reference servo head 60.

In operation bias currents I1 and I2 are supplied to heads 30, 50 and 60. A differential amplifier (e.g., amplifier 101 in FIG. 4) having inputs connected across current tap 42 and voltage tap 43 will pickup the straddle servo signal. Similarly, the reference servo signal may be picked up by a differential amplifier (e.g., amplifier 102 in FIG. 4) connected across current tap 44 and voltage tap 43. Alternatively, one amplifier may be connected across current taps 42 and 44 and the second amplifier connected across current tap 42 and voltage tap 43. In the latter case, the output of the first amplifier will represent the sum of the straddle and reference servo signals while the second amplifier will represent the straddle servo signal. The reference signal may be recovered by a simple subtraction of the straddle signal from the combined signal.

The centerline-to-centerline distances (i) between data head 30 and straddle servo head 50 and (ii) between straddle servo head 50 and reference servo head 60, respectively labeled S and T in FIG. 5, should be one and one half (1.5) and one half (0.5) track widths, respectively. This spacing determines the track pitch when the servo system is used to record (subject to minor adjustments made with the offset adjustment described above). Without any offset, the centerline 51 of straddle servo head 50 will align with the top edge of the displaced data track and the centerline 61 of reference servo head 60 will align with the centerline of the displaced data track while the centerline 31 of data head 30 is aligned with the centerline of the selected data track.

Preferably, the length M of data head 30 is made slightly less than or equal to the full track width. The length P of straddle servo head 50 may be two thirds of the full track width to provide for sensing position errors of up to plus or minus one third of a track. The size however is not critical, limited only by head sensitivity and the magnitude of the instantaneous positional errors capable of being detected by servo head 50. As previously discussed, reference servo head 60 may be made half of the size of straddle servo head 50 to advantageously eliminate the need for scaling the servo head outputs. Servo heads 50 and 60 may however be made wider or narrower depending on system requirements, including head sensitivity and azimuthal selectivity. Reference servo head 60 should be kept small enough and positioned properly to allow it to remain within the boundaries of the reference track to provide a stable reference output for instantaneous LTM shifts. Because positional errors are corrected by the servo system, there is obviously no upper limit on the magnitude of the low frequency LTM shifts for which the servo system may correct.

If preferred, a double stripe of magneto-resistive material may be used to enhance the common-mode rejection of data head 30. The servo functions however do not require a double MR strip which adds additional complexity to the head. Therefore, a second magneto-resistive strip (not shown) may be joined to element 11 adjacent to the data head portion 30.

Figure 6:
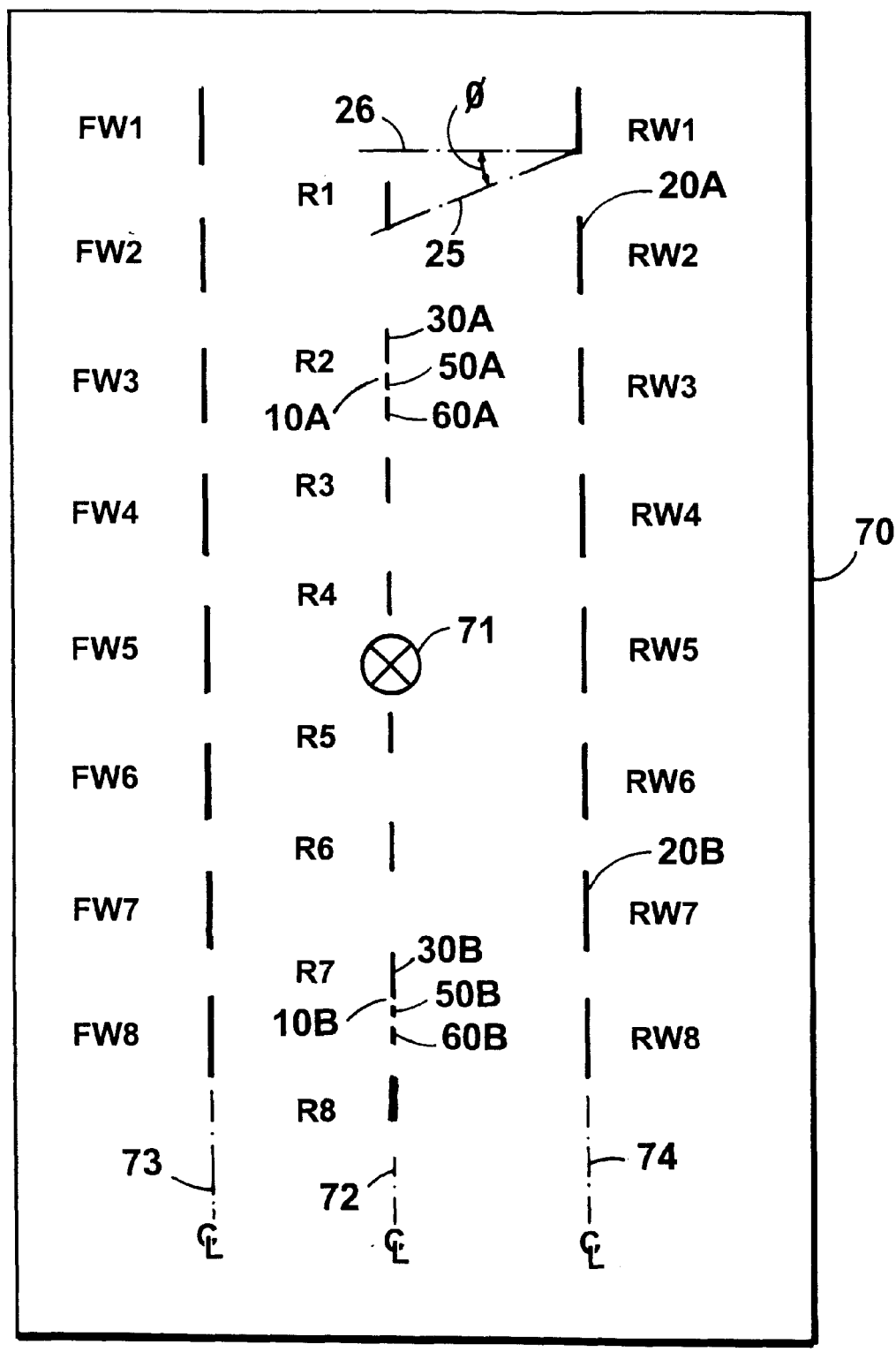
FIG. 6 schematically shows an eight channel bi-directional azimuth record/read head for use with the servo system.

Referring to FIG. 6, a schematic representation of an eight channel bi-directional azimuth read/write head for use with the present invention is illustrated. Each read head, shown schematically as a vertical line and labeled R1 through R8 in FIG. 6, is aligned on a centerline 72 which also passes through pivot point 71. Two sets of servo heads 50A, 60A and 50B, 60B are also shown associated with read heads R2 and R7. Although only one set of servo heads is required, a redundant second set may be provided to allow for continued operation in the event of a failure. Two banks of eight write heads labeled FW1 through FW8 and RW1 through RW8 are provided to allow for writing in either tape direction. The write heads are positioned slightly above the respective read head to compensate for the azimuth as shown by the angle φ between line 75 drawn between the bottom of read head R1 and write head RW1 and horizontal line 76.

During forward tape transport, the head assembly 70 is rotated counterclockwise about point 71 creating the azimuth angle (centerline axes 72, 73, 74 tilt to the left) aligning read heads R1–R8 and forward write heads FW1–FW8 with the horizontal data tracks. Either pair of servo heads (50A and 60A or 50B and 60B) may be used to keep the heads on track. During reverse tape transport the head assembly 70 is rotated in the other direction, clockwise, thereby aligning read heads R1–R8 and reverse write heads RW1–RW8 with the data tracks. Although the write heads are all shown as the same size, different size heads may be used for each track or group of tracks to allow for backward compatibility with older machines.

Referring again to FIG. 1, the initial calibration procedure for a blank tape will be described. First the beginning of tape ("BOT") hole and the edge of the tape are located. The first track e.g., track 91, is written as for example 8 mils wide. Then the second track 92 is written on the second pass in the opposite tape transport direction with a complimentary azimuth angle. As previously explained, the writing of an adjacent track determines the width of the previous track by virtue of the overlap. The first track 91 is left wider than the other tracks on the tape because the servo is not used at this point and also to provide for a guard band. The first track 91 may be made for example 4 mils wide. The edge 94 of the first track is well defined after the second track 92 is written. The edge 94 will be used for servoing as previously described when writing the third track 93. By servoing off of an edge of a displaced data track, in this case the first data track 91, the servo system employs a well defined track edge for positional reference and allows the servo system to be used to set the width of all, except for the first, data tracks. Since the servo is operational for writing the third and subsequent data tracks, the width of the second and subsequent data tracks may be left narrower than the first data track without risking data loss due to LTM. For example the second and subsequent tracks may be 0.8 to 1.0 mils wide. It will be appreciated that tracks of uniform width and with the edge contours being substantially parallel are written using the servo system.

The fourth and subsequent tracks are written in the same manner. For example, when writing the fourth track (not shown) the edge 95 of track 92 is used for servoing. Since a complimentary azimuth angle is used, reference servo head 60 will follow track 92 with the straddle servo head 50 straddling the boundary 95 between tracks 92 and 93.

The servo system operates in the same manner during read operations to minimize the effects of LTM. The servo system follows the bottom edge of the adjacent track during read and write operations. Technically, however, the servo information is provided by the second track down from the read track. The adjacent track, being out of azimuth, provides no signal, but defines the edge of the displaced data track which does provide the servo and reference information. The displaced data track need not be the second track away from the selected read or write track, however, cumulative errors and limitations on the availability of the servo system for use during writing make the second track preferable.

Figure 7:
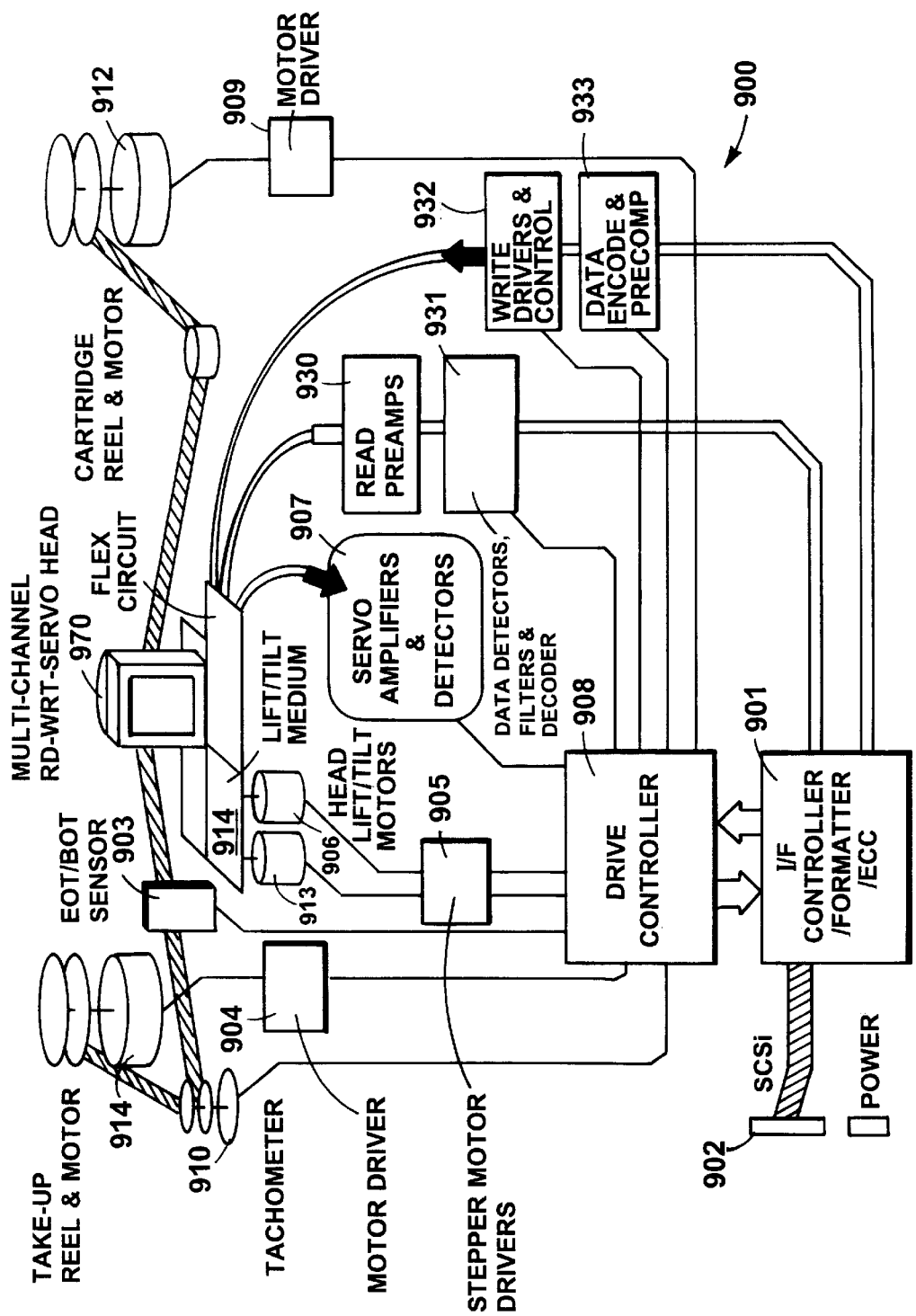
FIG. 7 schematically shows a functional block diagram of a tape drive system incorporating the servo system.

Referring to FIG. 7, a system block diagram of a tape drive system incorporating the servo system is shown. A tape transport system schematically represented by the two take-up reels and motors 911 and 912 transports the tape past a multi-channel read-write and servo head assembly 970. Preferably, a head assembly such as head assembly 70 shown in FIG. 6 may be used. The tape transport system includes a tachometer 910 for sensing the tape speed and a sensor 903 for detecting the beginning and end of tape marks. A drive microcontroller 908 which may be implemented with a microprocessor, a microcontroller, or dedicated logic circuitry, is used to control the mechanical operation of the transport. The tape transport motors 911 and 912 are controlled through motor drivers 904 and 909, respectively. Microcontroller 908 receives tape speed information from tachometer 910 and controls the transport motors 911, 912 to establish and maintain the proper tape tension and velocity, including ramping the tape speed up and down.

Communication with a SCSI interface 902 is handled by a controller/formatter 901. The controller/formatter receives and processes commands and collects and returns status to the interface 902. The controller/formatter is also responsible for formatting the write data received from the interface and performing the error correcting code ("ECC") functions for the drive 900.

The read preamplifiers 930 amplify the signals from the read heads. The amplified read signals are fed to the data detection, filtering, and decoding circuitry 931 which supplies the raw data to the controller/formatter 901. The controller/formatter 901 performs the error correcting functions and supplies the data to the interface. Conversely during write operations, the controller/formatter 901 encodes and formats the write date from the interface and supplies it to the write data encoder and precompensation circuitry 933. The write drivers 932 drive the write heads causing the encoded and precompensated write data to be recorded on the tape. Drive controller 908 may be used to control the functions of the read and write circuitry such as the filter settings, type of data encoding and decoding, such as MFM or 2 of 7 RLL, write current level, and amount of write precompensation.

The controller/formatter 901 sends the track position commands to the drive microcontroller 908 which issues commands to the stepper motor drivers 905 which drive stepper motors 913 and 906. Motors 913 and 906 both tilt the heads to establish the desired azimuth angle and move the heads up and down across the tape to switch tracks using the lift-tilt mechanism 914. For example, each motor may be connected to one end of the lift-tilt mechanism 914 through a lead screw. Both motors acting in unison i.e., in the same direction will cause a track change while relative movement between the motors will effect the tilt. Alternatively, one motor may be used exclusively to change tracks and the other exclusively to effect the tilt.

The servo amplifiers and detectors 907 may perform the amplification, scaling, filtering, and peak envelope detection functions described above. The drive controller 908 may receive the position error and track position command signals as inputs and generate the appropriate control signals for output to the stepper motor drivers 905. Alternatively, the drive controller 908 may receive the amplified servo and reference signals as well as an optional offset signal directly performing the comparison operation internally and outputting a signal to the stepper motor drivers 905.

Although preferred embodiments using magneto-resistive elements have been described for illustrative purposes, it will be appreciated that any suitable type of head or transducer may be used to perform the transducing function. For example, a write head or a read/write head may be substituted for the magneto-resistive data head 30 in FIG. 5. Servo heads such as heads 50A and 60A in FIG. 6 alternatively may be axially aligned with one or more of the write heads along centerline 73 or 74 or located along an axis between the write heads FW, RW and the read heads R.

In an alternative embodiment (not shown) a dedicated servo controller may be implemented.

It will be appreciated the head positioning system has been described in the context of an overlap writing system to maintain backward compatibility with previous tape systems. However, the servo system may be advantageously adapted to a system which employs narrower write heads in which the tracks are not overwritten thus allowing multiple random write operations. Although described for use in a tape head positioning system, the servo system may also be advantageously used in disk drive environments.

What is claimed is:

1. A head positioning servo system for reducing positional errors between a data transducer and a selected data track on a medium, comprising:

a head assembly;

a data transducer for writing to or reading from a selected data track;

a servo transducer;

a reference transducer;

said data, servo, and reference transducers being mounted in a predetermined spacial relationship in said head assembly such that alignment of said data transducer with said selected data track is substantially coincident with alignment of said servo transducer with an edge of a displaced data track and with alignment of said reference transducer with a central portion of said displaced data track;

a servo control circuit having a first input connected to said servo transducer, a second input connected to said reference transducer, and an output; and a positioner having an input connected to said output of said servo control circuit and having an output connected to move said head assembly;

said servo control circuit compares servo signals representative of signals picked up from said servo transducer with reference signals representative of signals picked up from said reference transducer to form a position output signal;

said positioner moves said head assembly in response to said position output signal to reduce positional alignment errors between said data transducer and said selected data track.

2. The head positioning servo system of claim 1 wherein said predetermined spacial relationship is such that said servo transducer is aligned to have approximately one half of its sensor area on the displaced data track and approximately one half of its sensor area off of the displaced data track, and said reference transducer is aligned to have substantially all of its sensor area within said displaced data track.

3. The head positioning servo system of claim 2 wherein:

said data track may be characterized by a track width; and said servo transducer comprises a sensor length less than or approximately equal to said track width and said reference transducer comprises a sensor length less than or approximately equal to one half of said track width.

4. The head positioning servo system of claim 3 wherein:

said head assembly comprises a magneto-resistive transducer comprising said data transducer and a servo portion, said data transducer comprising a first and a second current lead and said servo portion comprising said second current lead, a third current lead, and a voltage tap;

said second current lead forming a gap and allowing for signal isolation between said servo portion and said data transducer;

said voltage tap dividing said servo portion into said servo transducer and said reference transducer.

5. The head positioning servo system of claim 3 wherein said predetermined spacial relationship is such that said displaced data track is the second track away from said selected data track.

6. The head positioning servo system of claim 3 wherein said length of said servo transducer is approximately two thirds of said track width and said sensor length of said reference transducer is approximately one third of said track width.

7. The head positioning servo system of claim 3 wherein said edge of said displaced data track is defined by overlap of complementary azimuthally recorded tracks.

8. The head positioning servo system of claim 7 wherein said displaced data track comprises an azimuth approximately matching an azimuth of said selected data track.

9. A head positioning servo method for reducing head position alignment errors for reading or writing one of a plurality of substantially parallel data tracks comprising the steps of:

providing a data transducer for cooperation with a selected data track;

providing a servo transducer in a predetermined spacial relationship with said data transducer, such that said servo transducer is positioned to follow an edge of a displaced data track while said data transducer is aligned with said selected data track;

providing a reference transducer in a predetermined spacial relationship with said data transducer such that said reference transducer is positioned to follow between the edges of said displaced data track while said data transducer is aligned with said selected data track;

comparing signals from said servo transducer with signals from said reference transducer;

moving said transducers into alignment with said selected and displaced data tracks in response to results of said comparing step.

10. A transducer head adapted for use with a head positioning servo system for maintaining alignment between said transducer head and a data track, comprising:

a data transducer for writing to or reading from a selected data track;

a servo transducer;

a reference transducer;

said data, servo, and reference transducers being mounted in a predetermined spacial relationship in said transducer head;

said predetermined relationship being such that alignment of said data transducer with said selected data track is substantially coincident with alignment of said servo transducer with an edge of a displaced data track and with alignment of said reference transducer with a central portion of said displaced data track.

11. The transducer head of claim 10 wherein:

said displaced data track comprises the second data track away from said selected data track.

12. The transducer head of claim 10 wherein:

said servo transducer comprises a sensor area;

said alignment of said servo transducer with said edge is such that said sensor area of said servo transducer straddles said edge of said displaced data track with substantially equal portions of said sensor area on each side of said edge.

13. The transducer head of claim 12 wherein:

said reference transducer comprises a sensor area of about half of said sensor area of said servo transducer.

14. The transducer head of claim 12 wherein:

said transducer head comprises a magneto-resistive transducer comprising said data transducer which comprises a first and a second current lead and a servo portion which comprises said second current lead, a third current lead, and a voltage tap;

said second current lead forming a spatial gap and allowing for signal isolation between said servo portion and said data transducer; and said voltage tap dividing said servo portion into said servo transducer and said reference transducer.

15. The transducer head of claim 12 wherein said servo transducer has a length of approximately two thirds of said track width and said reference transducer has a length of approximately one third of said track width.

16. A method of recording tracks on a record medium comprising the steps of:

writing a first track with a starting track width;

writing a second track partially overlapping said first track, defining a first track edge, and reducing said first track to a first track width;

writing a third track defining an adjacent track edge, and reducing an adjacent track to a second track width using said first track edge as servo position information and said first track as servo reference information.

17. The method of claim 16 further comprising:

making said second track width narrower than said first track width.

18. The method of claim 16 wherein:

said second track edge and said first track edge each comprises a contour; and said step of writing said third track includes defining said contour of said second track to be substantially parallel to said contour of said first track edge.

19. The method of claim 16 wherein:

said first track edge and said adjacent track edge are defined by overlap of complementary azimuthally recorded tracks.

20. The method of claim 16 wherein:

said step of writing said first track is carried out with a first azimuth;

said step of writing said second track is carried out with a second azimuth, said second azimuth being substantially complementary to said first azimuth; and said step of writing said third track is carried out with a third azimuth, said third azimuth being substantially complementary to said second azimuth and substantially matching said first azimuth.

21. A tape drive system having a head assembly, a tape transport for moving magnetic tape past the head assembly, and an interface for communicating with a computer comprising:

a head positioning servo system for reducing positional errors between a data transducer and a selected data track on the tape, a data transducer for writing to or reading from a selected data track;

a servo transducer;

a reference transducer;

said data, servo, and reference transducers being mounted in a predetermined spacial relationship in said head assembly such that alignment of said data transducer with said selected data track is substantially coincident with alignment of said servo transducer with an edge of a displaced data track and with alignment of said reference transducer with a central portion of said displaced data track;

a servo control circuit having a first input connected to said servo transducer, a second input connected to said reference transducer, and an output; and a positioner having an input connected to said output of said servo control circuit and having an output connected to move said head assembly;

said servo control circuit compares servo signals representative of signals picked up from said servo transducer with reference signals representative of signals picked up from said reference transducer to form a position output signal;

said positioner moves said head assembly in response to said position output signal to reduce positional alignment errors between said data transducer and said selected data track.

22. The tape drive system of claim 21 wherein said predetermined spacial relationship is such that said servo transducer is aligned to have approximately one half of its sensor area on the displaced data track and approximately one half of its sensor area off of the displaced data track, and said reference transducer is aligned to have substantially all of its sensor area within said displaced data track.

23. The tape drive system of claim 22 wherein:

said data track may be characterized by a track width; and said servo transducer comprises a sensor length less than or approximately equal to said track width and said reference transducer comprises a sensor length less than or approximately equal to one half of said track width.

24. The tape drive system of claim 23 wherein:

said head assembly comprises a magneto-resistive transducer comprising said data transducer and a servo portion, said data transducer comprising a first and a second current lead and said servo portion comprising said second current lead, a third current lead, and a voltage tap;

said second current lead forming a gap and allowing for signal isolation between said servo portion and said data transducer;

said voltage tap dividing said servo portion into said servo transducer and said reference transducer.

25. The tape drive system of claim 23 wherein said predetermined spacial relationship is such that said displaced data track is the second track away from said selected data track.

26. The tape drive system of claim 23 wherein said length of said servo transducer is approximately two thirds of said track width and said sensor length of said reference transducer is approximately one third of said track width.

27. The tape drive system of claim 23 wherein said edge of said displaced data track is defined by overlap of complementary azimuthally recorded tracks.

28. The tape drive system of claim 27 wherein said displaced data track comprises an azimuth approximately matching an azimuth of said selected data track.

* * * * *